Figure 1:
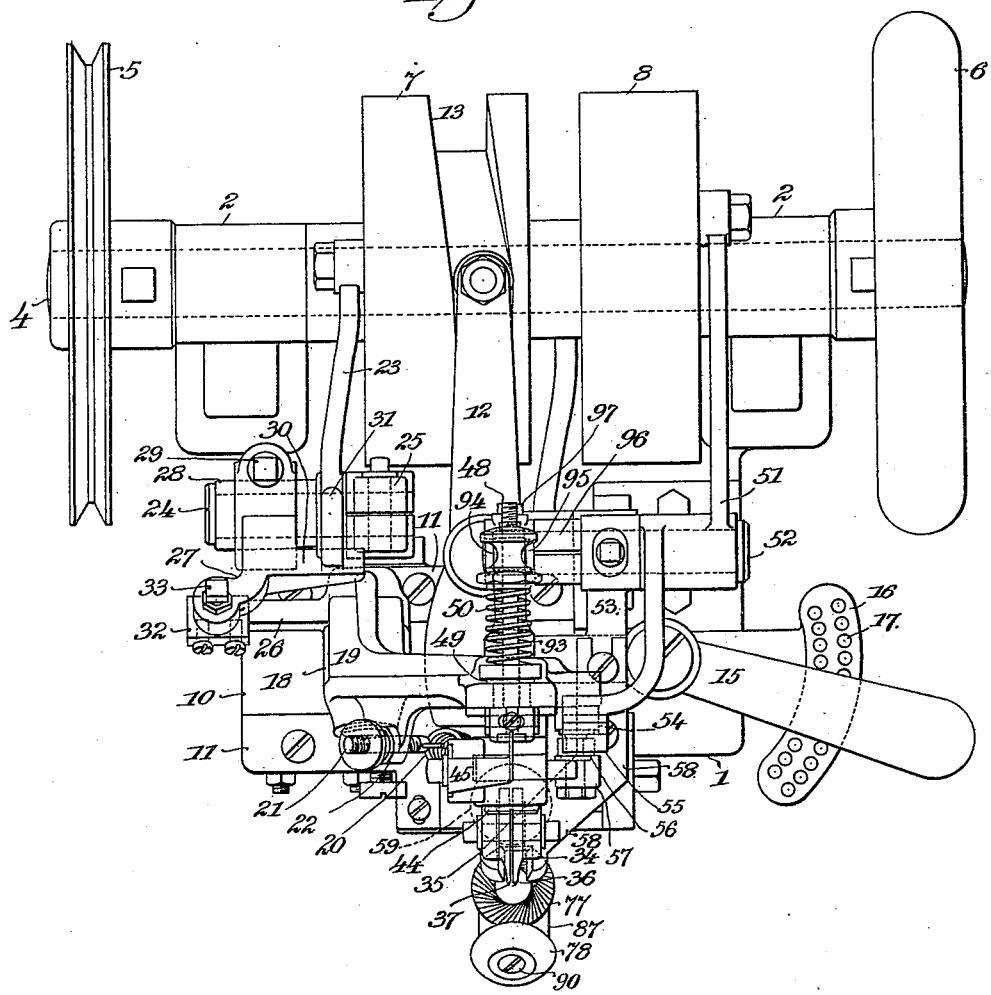

No. 690,422. Patented Jan. 7, 1902.
J. B. HADAWAY.
STITCH SEPARATING MACHINE.
(Application filed Dec. 3, 1900.)

(No Model.) 5 Sheets—Sheet 1.

Witnesses: Inventor:
John F. C. Prinkert John B. Hadaway
Fred O. Fish by his Attorney
Benjamin Phillips

THE NORRIS PETERS CO., PHOTO-LITHO., WASHINGTON, D. C.

No. 690,422. Patented Jan. 7, 1902.
J. B. HADAWAY.
STITCH SEPARATING MACHINE.
(Application filed Dec. 3, 1900.)
(No Model.) 5 Sheets—Sheet 2.

Witnesses:
John F. C. Prankert
Fred O. Fish

Inventor:
John B. Hadaway
by his Attorney
Benjamin Phillips

No. 690,422. Patented Jan. 7, 1902.
J. B. HADAWAY.
STITCH SEPARATING MACHINE.
(Application filed Dec. 3, 1900.)
(No Model.) 5 Sheets—Sheet 3.
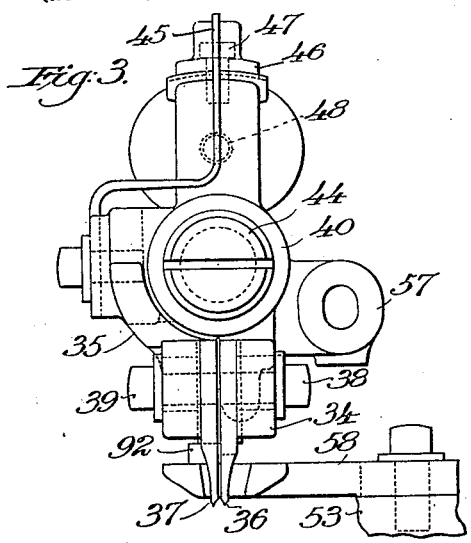
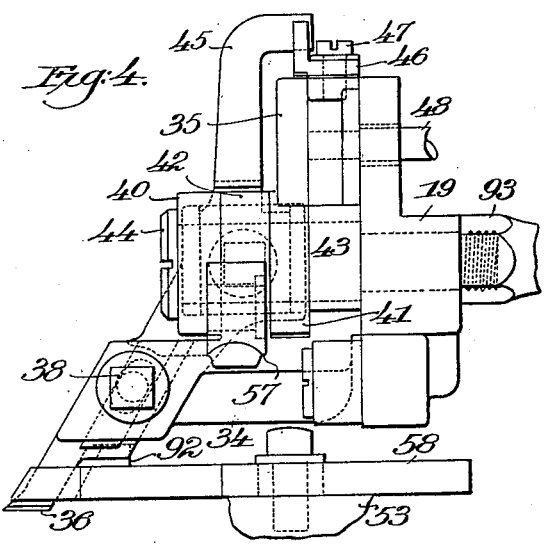
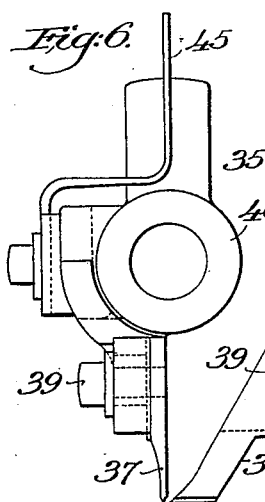
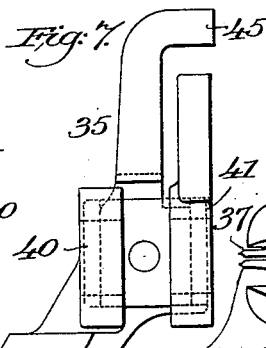
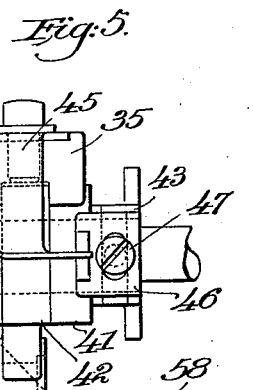
Witnesses:
John F. C. Prinkler
Fred O. Fish
Inventor:
John B. Hadaway
by his Attorney
Benjamin Phillips No. 690,422. Patented Jan. 7, 1902.
J. B. HADAWAY.
STITCH SEPARATING MACHINE.
(Application filed Dec. 3, 1900.)
(No Model.) 5 Sheets—Sheet 4.
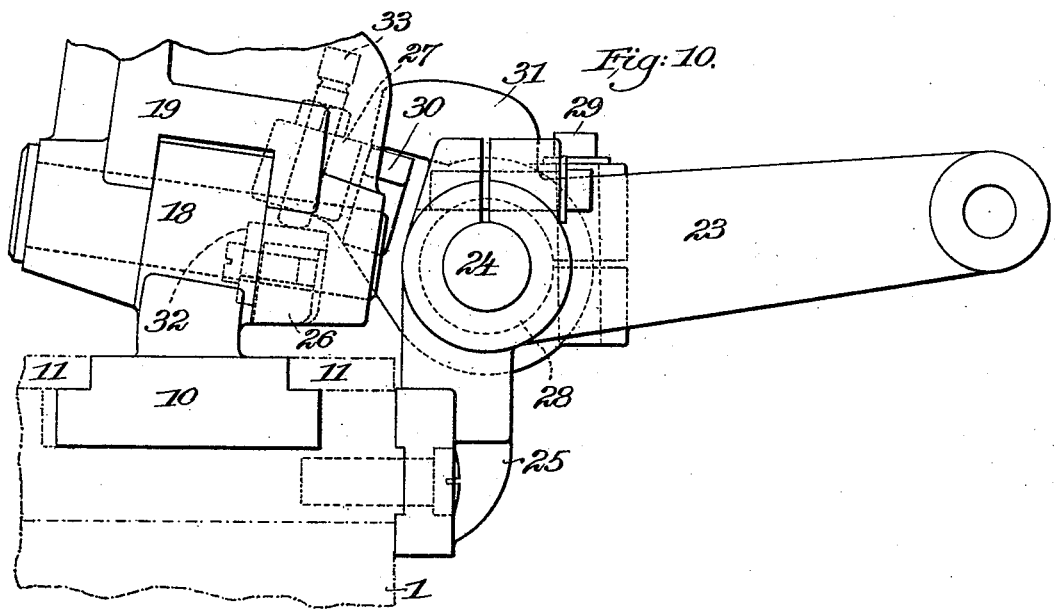
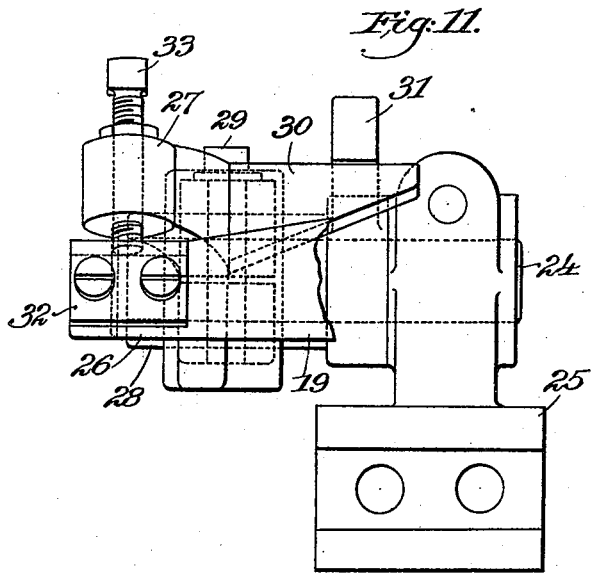
Witnesses:
John F. C. Prinkert
Fred O. Fish
Inventor:
John B. Hadaway
by his Attorney
Benjamin Phillips
THE NORRIS PETERS CO., PHOTO-LITHO., WASHINGTON, D. C.

No. 690,422. Patented Jan. 7, 1902.
J. B. HADAWAY.
STITCH SEPARATING MACHINE.
(Application filed Dec. 3, 1900.)
(No Model.) 5 Sheets—Sheet 5.
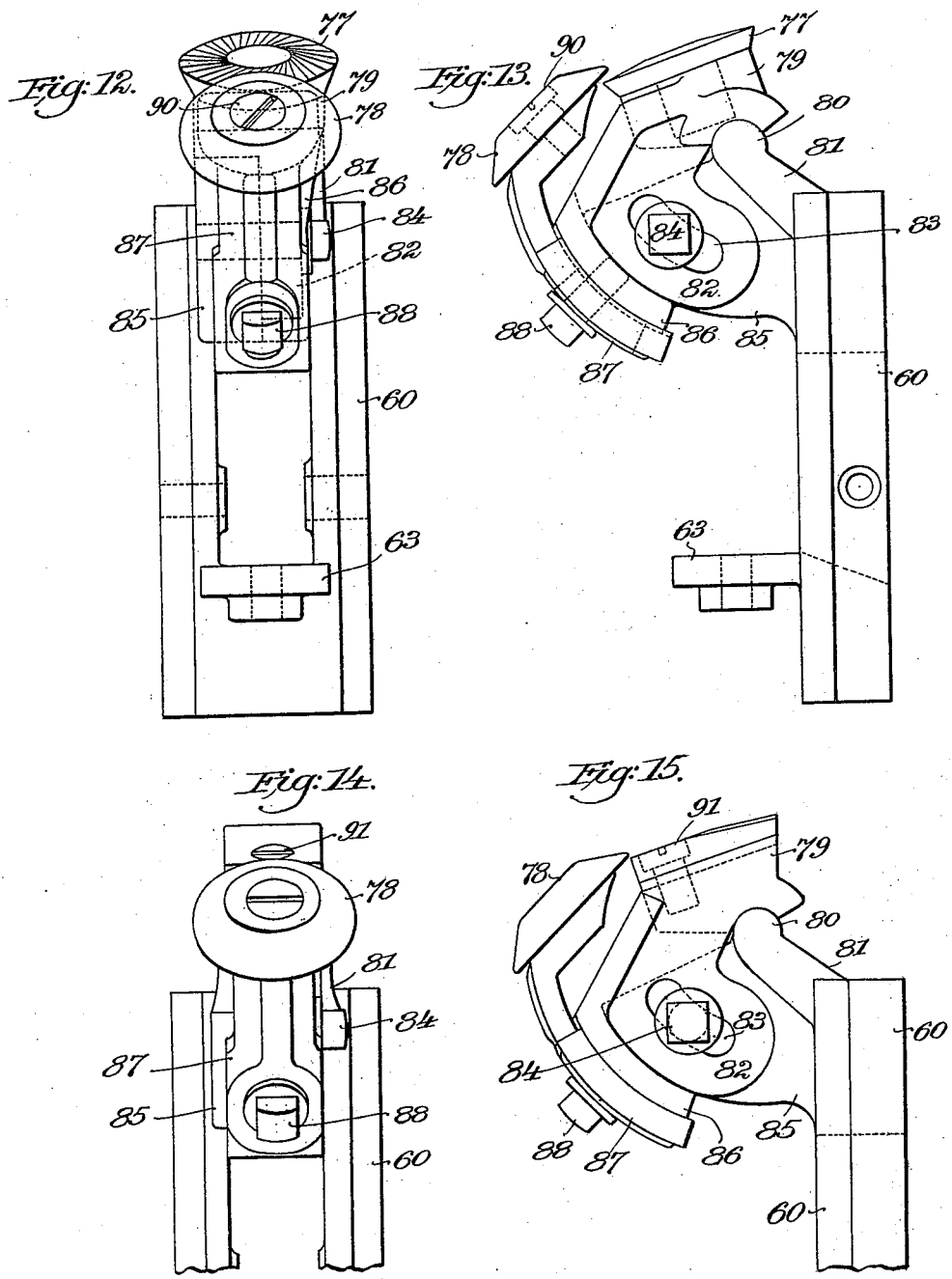

UNITED STATES PATENT OFFICE.

JOHN B. HADAWAY, OF BROCKTON, MASSACHUSETTS.

STITCH-SEPARATING MACHINE.

SPECIFICATION forming part of Letters Patent No. 690,422, dated January 7, 1902.

Application filed December 3, 1900. Serial No. 38,425. (No model.)

*To all whom it may concern:*

Be it known that I, JOHN B. HADAWAY, a citizen of the United States, residing at Brockton, in the county of Plymouth and State of Massachusetts, have invented certain new and useful Improvements in Stitch-Separating Machines; and I do hereby declare the following to be a full, clear, and exact description of the invention, such as will enable others skilled in the art to which it appertains to make and use the same.

The present invention relates to stitch-separating machines, and more particularly to that class of such machines which are adapted to operate upon the edges of boot and shoe soles to indent the intervals between the stitches appearing on the upper surface of the sole.

In general the object of my invention is to provide a stitch-separating machine of the class referred to of improved construction and mode of operation.

More particularly among the objects of my invention is to improve the construction and mode of operation of the indenting-tools of a stitch-separating machine.

Owing to the varying lengths of stitches often found in boot and shoe work it is desirable to provide means for locating the indenting-tool in the stitch intervals in order to prevent the tool striking on the crowns of the stitches and cutting or injuring the thread and marring instead of improving the appearance of the seam. It is also desirable to compensate for the varying lengths of stitches at each operation of the indenting-tool by feeding the work varying distances, corresponding to the lengths of the stitches, in order to prevent the cumulative effect of the variations and to permit the tool to properly locate the stitch intervals. In several machines heretofore patented by me I have provided means for accomplishing these results. Such machines, however, have been provided with but a single indenting-tool for locating and indenting the stitch intervals. To produce the best results, it is necessary to subject each stitch interval to at least two indenting actions, as the material tends to return to its original position after the first indenting action and obliterate the indention, and in a single-tool machine this tendency is accentuated by the pressure of the tool in indenting the next adjacent stitch interval. Several machines provided with two indenting-tools have been devised; but in none of these machines, so far as I am aware, has means been provided for locating the tools in the stitch intervals, whether the stitches are of uniform or varying lengths, or for adjusting the position of the work to compensate for varying lengths of stitches.

A feature of my invention consists in providing a stitch-separating machine with two indenting-tools relatively movable with relation to each other and with means for locating said tools in two stitch intervals and for actuating the tools to indent the stitch intervals. These tools are preferably arranged to indent adjacent stitch intervals, so that each tool is prevented from displacing the material into the indentation formed by the other tool; also, the work is preferably moved a distance equal to the length of a stitch between successive actuations of the tools, whereby each stitch interval is acted upon twice by the tools, being acted upon once by one tool and once by the other tool. To compensate for the varying lengths of stitches to enable the tools to be located in the stitch intervals, the distance through which the work is moved between successive actuations of the tools is preferably varied to correspond to the lengths of the stitches acted upon, my invention, however, being applicable to a machine having any suitable means for compensating for the varying lengths of stitches. It has been proposed to provide an indenting-tool with a groove or notch to act on and shape the crowns of the stitches, and, if desired, I can and preferably do provide my tools with such grooves or notches, in which case each tool will act to shape one end and a portion of the crown of a stitch, the two tools coacting to complete the shaping of the stitch.

Another feature of my invention consists in providing a stitch-separating machine with an improved form of work-support capable of a wider range of adjustment than those heretofore used in this class of machines, whereby the sole edge of widely-varying classes and styles of work can be properly presented to the action of the indenting-tool.

Other features of my invention consist in certain devices and combinations of devices, as will be hereinafter described and claimed.

My present invention is intended, primarily, as an improvement on the machine disclosed in my prior Letters Patent, No. 543,012, dated July 23, 1895; but it is to be understood that it is not limited thereto, but may be embodied in any suitable form of stitch-separating machine without departing from the spirit thereof. It is also to be understood that my invention is not limited to the details of construction illustrated in the drawings and hereinafter described.

Having thus indicated the nature and scope of my invention, I will now proceed to describe the illustrated embodiment thereof shown in the accompanying drawings, in which—

Figure 2:
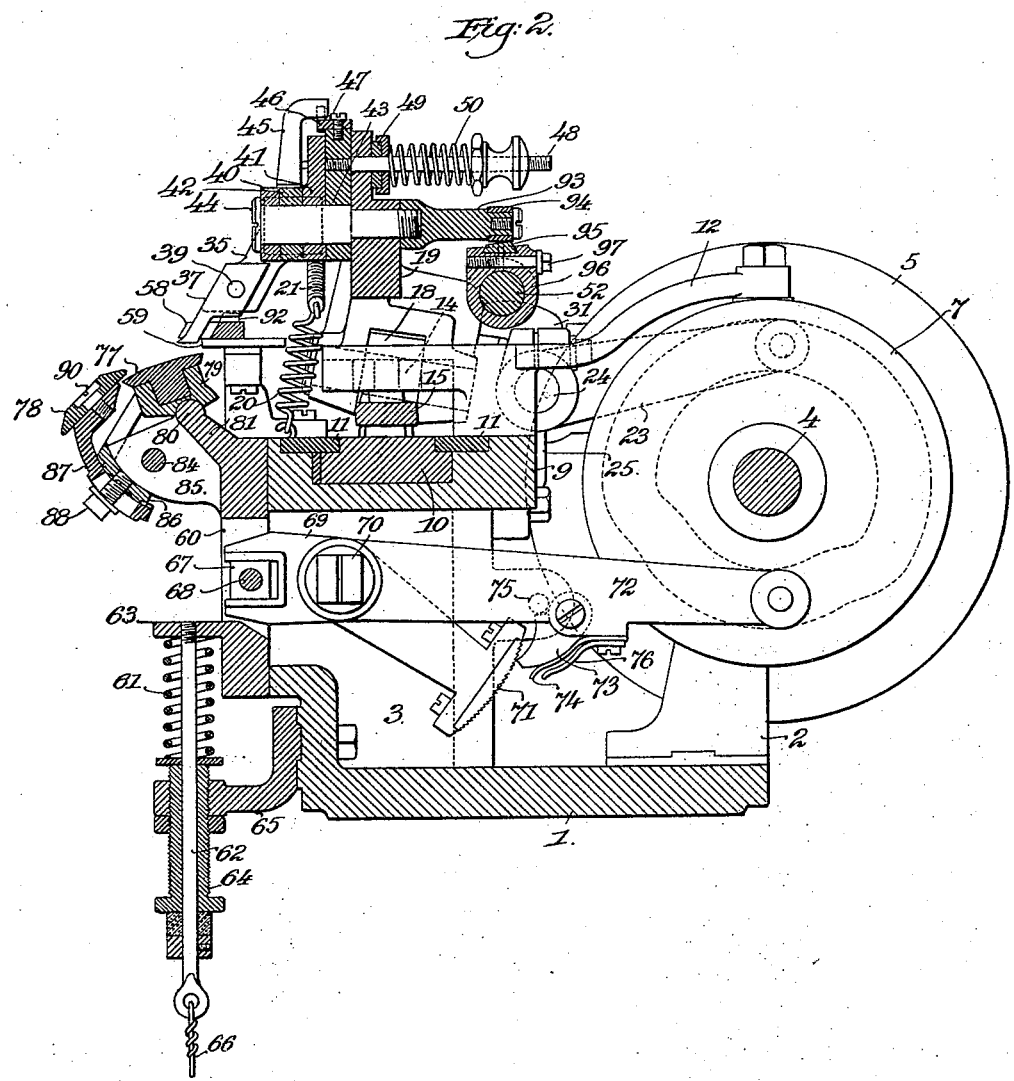

Figure 1 is a plan view of the machine disclosed in the patent above referred to with my present invention applied thereto. Fig. 2 is a central longitudinal sectional view of the machine shown in Fig. 1. Fig. 3 is a view in front elevation of the two indenting-tools and the upper work-support. Fig. 4 is a view in side elevation of the indenting-tools, the lever upon which they are mounted, and the upper work-support. Fig. 5 is a plan view of the parts shown in Fig. 3. Fig. 6 is a detail front view of one of the indenting-tools detached, and Fig. 7 is a side view thereof. Fig. 8 is a front view of the other indenting-tool detached, and Fig. 9 is a side view thereof. Fig. 10 is a detail view showing the lever which lifts the tools from the work and the adjustable connection between the lever and the tool-carrier. Fig. 11 is a detail view of the lever for lifting the tools from the work and a portion of the tool-carrier looking from the left of Fig. 10. Fig. 12 is a front view of my improved work-support. Fig. 13 is a side view thereof. Fig. 14 is a front view of a modified form of work-support, and Fig. 15 is a side view thereof.

Referring to the drawings, in which like characters of reference indicate like parts, the frame of the machine comprises a base-plate 1, provided with upwardly-extended rear standards 2 and front standard 3. Journaled in the rear standards 2 is a driving-shaft 4, provided at one end with a driving-pulley 5 and at the other end with a hand-wheel 6 and between the standards 2 with the cams 7 and 8, which are provided with suitable cam-grooves, from which the moving parts of the machine are actuated, as will be hereinafter described.

Secured to the upper part of the front standard 3 or formed integral therewith is a plate 9, provided on its upper surface with a groove, in which a slide 10 is held by means of guide-plates 11. The slide 10 is a feed-slide and is reciprocated in the groove in the block 9 a distance equal to the average length of a stitch in the work being operated upon by means of a lever 12, pivoted upon the plate 9. The rear end of the lever is provided with a roller, which engages a cam-groove 13, formed in the peripheral face of the cam 7. The forward end of the lever 12 projects over the slide 10 and is provided with a longitudinal groove, in which is mounted a rectangular block 14, pivotally secured to one end of a lever 15, pivoted to the slide 10. By means of the lever 15 the block 14 can be moved in the slot in the lever 12 toward and from the pivot of the lever to thereby adjust the extent of the reciprocating movement of the slide 10. The outer end of the lever 15 extends over a segmental plate 16, secured to or formed integral with the slide 10. The plate 16 is provided with two series of holes 17, adapted to receive stop-pins to limit the throw of the lever 15 in either direction.

The slide 10 is provided with an upwardly-extending projection 18, to which is pivoted the tool-carrying lever or frame 19. The lever 19 is depressed to bring the tools into engagement with the work by means of a coiled spring 20, one end of which is secured to the plate 9 and the other end of which is secured to an adjusting-screw 21, threaded through a lug 22, projecting laterally from the lever 19. For raising the lever 19 to lift the tools from the work a lifting-lever 23 is provided, pivoted upon a stud 24, clamped in a bracket 25, secured to the plate 9. The rear end of this lever is provided with a roll which engages the cam-groove in the face of the cam 7, and the front end of the lever is arranged to contact with the short end 26 of the lever 19. The lever 23 is made in two parts, so that one part can be adjusted relatively to the other to bring the point of contact of the lever with the short end 26 of the lever 19 nearer to or farther from the pivot of the lever 19. As shown, the forward end of the lever 23 consists of an arm 27, provided with a split hub, which surrounds the extended cylindrical hub 28 of the rear portion of the lever and is secured thereto by means of a clamping-bolt 29. In order to enable the arm 27 to be adjusted laterally on the hub 28 without being displaced radially, the arm 27 is provided with a lateral projection 30, the upper surface of which is arranged to contact with an overhanging lug 31 of the rear portion of the lever. To the outer end of the part 26 of the lever 19 is secured a wearing-plate 32, against which an adjustable screw 33 in the forward end of the arm 27 bears. By means of the construction above described the point of contact of the lifting-lever with the tool-carrying lever can be adjusted to vary the height to which the tool-carrying end of the lever 19 is lifted. The function of this construction will be described hereinafter.

The indenting-tools are shown separately in Figs. 6, 7, 8, and 9 and are designated as a whole by the numerals 34 and 35. Each tool consists of a stock and an indenting blade or tool proper, (designated by the numerals 36 and 37,) adjustably secured to the stock by screw-bolts 38 and 39. The stock of the tool 35 is provided with two hubs 40 and 41, and the stock of the tool 34 is provided with two hubs 42 and 43. These hubs are journaled upon a stud 44, projecting laterally from the side of the lever 19, the hub 42 being situated between the hubs 40 and 41 when the tools are in position. The tools 34 and 35 are yieldingly connected by means of a leaf-spring 45, the lower end of which is secured to the side of the stock of tool 35 and which extends inwardly and then upwardly and the upper end of which is received in a slot formed in the upwardly-extending portion of a block 46, secured to the top of the stock of tool 34 so as to be adjustable laterally thereon by means of a screw 47 passing through a slot in the block and engaging the tool-stock. A rod 48 passes through a slot in the lever 19 and screws into the upper portion of the stock of tool 34. Surrounding the rod 48 on the opposite side of the lever 19 from the tool 34 is a friction-plate 49, which is pressed against the side of lever 19 by means of a coiled spring 50, surrounding the rod 48 and interposed between the plate 49 and an adjusting-screw on the outer end of the rod. In the construction above described it will be seen that the tool 35 is connected to the tool 34 by means of a yielding connection, so that the indenting-blade 37 can move relatively to the indenting-blade 36. It will also be seen that the tool 34 can be moved on the pivot-stud 44 with relation to the lever 19 whenever sufficient force is exerted thereon to overcome the friction of the plate 49. The function of this construction will be explained in the description of the operation of the machine.

For depressing the lever 19 to cause the tools to indent the work the lever 51 is provided, pivoted upon a stud 52, rigidly secured to the standard 53 of the machine-frame. The rear end of the lever 51 is provided with a roll, which engages a cam-path in the face of the cam 8, and the forward end of the lever is shaped to engage a roller-stud 54, secured to the end of the lever 19. The forward end of the lever 51 is also provided with a flange 55, arranged to engage a roller-stud 56, secured in a lug 57, projecting laterally from the stock of tool 34.

58 designates the upper work-support, consisting of a plate secured to the standard 53. The forward end of the plate is slotted to provide an opening, in which the indenting-tools work. The upper work-support 58 is shaped to enter the crease between the upper and welt, and thereby act as a crease-gage and at the same time hold the upper out of contact with the indenting-tools. Situated just below the upper work-support 58 and to the rear of the indenting-tools is an edge-gage 59, consisting of a rotary disk mounted on the upper end of a stud journaled in an overhanging bracket secured to the plate 9.

In the front portion of the standard 3 of the machine-frame and beneath the indenting-tools is arranged to reciprocate a slide 60, upon the upper end of which the lower work-supports are mounted. This slide is pressed upwardly by means of a coiled spring 61, surrounding a rod 62, screwed into a horizontal projection 63 on the slide 60 and extending downwardly therefrom through a sleeve 64, having a screw-threaded engagement with the bracket 65, secured to the standard 3. The spring 61 bears at its upper end against the projection 63 of the slide 60 and at its lower end against a washer surrounding the rod 62 and resting on the upper end of the sleeve 64. The lower end of the rod 62 is connected by any suitable means, as by a wire 66, to a foot-treadle, (not shown,) by means of which the slide 60 and the lower work-support carried thereby can be depressed preparatory to the placing of a shoe in position to be operated upon by the indenting-tools. For forcing the slide upward positively and locking it in its raised position during the downward indenting movement of the indenting-tools the following mechanism is provided:

67 designates a rectangular block loosely mounted upon a stud 68, extending across an opening in the slide 60. The block 67 is received in a slot in the end of the lever 69, pivoted at 70 to the standard 3 and provided at the other end with a toothed segment 71. Also pivoted at 70 is a lever 72, the rear end of which is provided with a cam-roll engaging a cam-groove in the face of the cam 8. A pawl or pawls 73 are pivotally mounted upon the lever 72 and are arranged to engage the teeth of segment 71 when the rear end of the lever 72 is depressed, and thereby actuate the lever 69 to raise the slide 60. The pawls 73 are pressed into engagement with the teeth of the rack 71 by means of leaf-springs 74. On the upward movement of the lever 72 the pawls 74 are lifted out of engagement with the teeth of rack 71 to unlock the slide 60 by the engagement therewith of a pin 75 on the frame of the machine. In order to prevent the pawls from being thrown backward by the pin far enough to injure the springs 74, a guard-plate 76, secured to the lever 72 and extending under the springs, is provided.

The lower work-supports mounted on the upper end of slide 60 consist of a main support 77 and an auxiliary support 78.

The main work-support consists of a bevel-faced disk the axis of which is journaled in a block 79 at an angle to the vertical. The lower portion of the block is provided with a semicylindrical recess which receives the semicylindrical upper end 80 of a projection 81, extending upwardly and outwardly from the upper end of the slide 60. Extending downwardly and forwardly from the block 79 is a plate 82, in which is cut a segmental slot 83, concentric with the center of the semicylindrical end 80 of projection 81. A clamping-screw 84 extends through the slot 83 and screws into a forwardly-projecting flange 85 of the slide 60. By this construction the work-support 77 can be adjusted to change the angle of inclination of the work - supporting surface, the block 79 resting on the semicylindrical end of the projection 81 and turning on said end as a center. The plate 82 is provided with a flange 86 at right angles thereto, a portion of said flange being curved in the arc of a circle, the center of which is concentric with the semicylindrical end 80 of projection 81. Adjustably mounted on the curved portion of flange 86 is a slide 87, secured thereto by means of a bolt 88, passing through a slot in the slide and screwing into the flange. At the upper end of the slide 87 is an auxiliary work-support 78, consisting of a bevel-faced disk journaled thereon by means of a screw-stud 90. By adjusting the slide 87 on the flange 86 the auxiliary support can be moved perpendicularly to the work-engaging face of the main work-support 77. By the angular adjustment of the supports by means of the bolt-and-slot connection 83 and 84 and by the independent adjustment of the auxiliary support the work-engaging surfaces can be set at the desired angle to properly present the shoe edge to the indenting-tools and to fit the curvature of the soles of different styles and sizes of shoes.

I am aware that it has been proposed to provide an adjustable auxiliary work-support concentric with the main work-support, such a construction being disclosed in my prior patent above referred to. In the construction above described, however, the auxiliary support is outside of the main support, and a much wider range of adjustment is possible and a firmer support for the work is provided. So far as I am aware it is new to provide means for adjusting the work-support to change the angle of inclination of the work-engaging surface, and I consider this construction a feature of my invention whether used in connection with an auxiliary support or not.

In Figs. 14 and 15 I have shown a slightly-modified form of main work-support consisting of a stationary block rigidly secured to the block 79 by means of a screw 91.

Where a rotary disk is employed for the main work-support the sole-engaging surface will preferably be grooved, as indicated in Fig. 12, in which it will be seen that the grooves are not radial, but are inclined to the radii of the disk. By so arranging the grooves they tend to force the sole against the edge-gage in passing inward under the sole, but have no tendency to withdraw the sole from the edge-gage in passing outward to disengage the sole.

The operation of the machine above described is as follows: The block 14 having been adjusted in the slot in the lever 12 to cause the slide 10 to be moved a distance equal to the average length of a stitch in the work to be operated upon, the main and auxiliary lower work-supports having been adjusted to properly present the edge of the shoe to the indenting-tool and to fit the curved surface of the sole, and the shoe having been placed upon the lower work-supports with the sole bearing against the gage 59, the machine is thrown into operation. Starting with the indenting-tools down and at the extreme limit of their movement to the left, as viewed in Fig. 1, the lever 51 is actuated to raise the forward end of the lever, and simultaneously the lever 23 is actuated to depress the arm 27. The arm 27, engaging the short end 26 of the lever 19, raises the lever until the indenting-tools are clear of the work. The lever 12 is now actuated to move the slide 10 and the indenting-tools to the right a distance equal to the average length of a stitch. The arm 27 now rises, and the spring 20 acts to depress the lever 19 and bring the indenting-tools into contact with the work. In the meantime the lever 72 has been actuated to cause the pawls 73 to engage the teeth of segment 71 to actuate the lever 69 and raise the slide 60 and clamp the work firmly between the lower work-support 77 and the upper work-support 58. While the tools are held in contact with the work by the tension of spring 20 they are moved over the work in order to locate the tools in the intervals between the stitches. To so locate the tools the slide 10 may be moved in either or both directions. Preferably the cam-groove 13 will be so shaped as to first move the slide 10 in a direction tending to move the indenting-tools to the left, then to move the slide 10 in a direction tending to move the indenting-tools to the right beyond the position in which they originally engage the work, and then in a direction tending to return the tools to the position in which they engaged the work. If the stitches are of uniform length, the tools will be located in adjacent stitch intervals when first brought into contact with the work by the spring 20. If, however, the stitches vary in length, the tool 37 will first be located in a stitch interval and thereafter the tool 36 will be moved toward and from the tool 37 until it locates itself in the next adjacent stitch interval. The independent movement of the tool 36 is allowed by the yielding connection between the tools formed by the leaf-spring 45. After the tool 36 is located in the stitch interval the continued movement of the slide 10 will cause the tool-stock to be turned about the pivot-stud 44 against the friction exerted by the plate 49. The tools having been located in adjacent stitch intervals, the lever 51 is actuated to cause its forward end to engage the roller-stud 54 of the lever 19 and the roller-stud 56 of the tool 34. The descent of the forward end of the lever 51 will force down the end of the lever 19 and cause the tools to indent the stitch intervals in which they are located. The lever 72 is now actuated to bring the pawls 73 into engagement with pin 75 to release the slide 60, which is pressed upwardly by means of the spring 61 to hold the lower work-support yieldingly in contact with the work. The slide 10 is now moved to the left a distance equal to the average length of the stitch. In this movement the tool 36 will act to feed the work a distance equal to the length of the stitch located between the indenting-tools. This result is accomplished by the engagement of the forward end of lever 51 with the roller-stud 56, secured to the stock of tool 34, the tool being turned on the stud 44 by the engagement of the lever 51 with the stub 56, in case the stitch is longer than the average, and being turned on the stud 44 by the resistance of the work until the stud 56 contacts with the end of lever 51, in case the stitch is shorter than the average, the tool being thereafter moved to a certain fixed point by the movement of slide 10. In order to insure the stopping of tool 36 at a fixed point, the tool is provided with a rearwardly-extending shoulder which engages a lug 92 on the upper surface of the upper work-support 58.

In order to shape the crowns of the stitches in addition to indenting the stitch intervals, the indenting-tools are provided with oppositely-arranged grooves, whereby the tools are adapted to engage and shape the opposite ends of a stitch.

In order to provide means for varying the depth of the indentations, the tools 36 and 37 are adjustably secured to their tool-stock by means of the bolts 38 and 39. It will be noted, however, that if the tools 36 and 37 are adjusted relatively to the tool-stocks they will not be lifted the same distance above the work as before the adjustment unless the height to which the lever 19 is raised is correspondingly varied. Unless means are provided for varying the upward throw of lever 19 it is found that when the tools are adjusted to make a deep indentation they will not be raised high enough to clear the work, and if adjusted to make a shallow indentation they will be raised high enough to contact with and mar the upper unless the upper work-support is adjusted to cause the tools to project a less distance into the crease between the upper and welt. The means for adjusting the point of contact between the lifting-lever and the tool-carrying lever (shown in Figs. 10 and 11 and hereinbefore described) is for the purpose of varying the upward throw of the lever, and thereby allowing the tools to be adjusted to vary the depth of the indentations and still act well within the crease between the upper and welt.

In the construction hereinbefore described it will be seen that the indenting-tools are attached to one side of the lever 19 and that the force applied to the lever to cause the tools to indent the work acts upon the outer end of the lever. As a result of this construction it is found in practice that the tools sometimes fail to indent the work, as the resistance offered to the tools by the work is sometimes sufficient to spring or bend the lever 19. To prevent this result, the nut 93, which clamps the stud 44 to the lever 19, is extended rearwardly and provided with a friction-roller 94, which when the lever 19 is in its lowest position barely clears a cam-plate 95, secured in a split sleeve 96, secured to the stud 52 by means of a clamping-bolt 97. By this construction in the normal operation of the device the roller 94 does not contact with the cam-plate 95; but in case sufficient resistance is offered to the indenting-tools to spring the lever 19 the roll 94 contacts with the cam-plate, and thereby prevents the springing of the lever and forces the tools into the work.

Having thus described my invention, I claim as new and desire to secure by Letters Patent of the United States—

1. A stitch-separating machine, having, in combination, two indenting-tools movable relatively to each other, means to locate each of said tools in a separate stitch interval whether the stitches are of uniform or varying length, and means to actuate said tools to indent said stitch intervals, substantially as described.

2. A stitch-separating machine, having, in combination, two indenting-tools, means to locate one of said tools in a stitch interval whether the stitches are of uniform or varying length, means to move the second tool relatively to the first tool to locate said second tool in the next adjacent stitch interval, and means to actuate the tools to indent said stitch intervals, substantially as described.

3. A stitch-separating machine, having, in combination, two indenting-tools, a yielding connection between said tools, means to actuate said tools to locate one tool in a stitch interval and to move the second tool relatively to the first tool to locate the second tool in another stitch interval, and means to actuate the tools to indent the stitch intervals, substantially as described.

4. A stitch-separating machine, having, in combination, an indenting-tool and actuating means therefor, a slide, a work-support mounted thereon arranged to engage the bottom of a shoe-sole, and means for adjusting the work-support on said slide to vary the angle of inclination of the sole-engaging surface, substantially as described.

5. A stitch-separating machine, having, in combination, an indenting-tool and actuating means therefor, a main work-support arranged to engage the bottom of a shoe-sole, an auxiliary work-support outside of the main work-support, a pivotally-mounted block to which said supports are secured, means for adjusting said block to vary the angle of inclination of the sole-engaging surfaces of the main and auxiliary work-supports, and means for adjusting the auxiliary support relatively to the main work-support, substantially as described.

6. A stitch-separating machine, having, in combination, an indenting-tool and actuating means therefor, a main and an auxiliary work-support, means for adjusting said supports to vary the angle of inclination of the sole-engaging surfaces, and means for adjusting the auxiliary support relatively to the main work-support, substantially as described.

7. A stitch-separating machine, having, in combination, an indenting-tool, means to locate said tool in a stitch interval, means to actuate the tool to indent the stitch interval, means to actuate the tool to feed the work the length of the preceding stitch, and a second indenting-tool yieldingly connected to the first-mentioned tool arranged to locate and indent another stitch interval, substantially as described.

8. A stitch-separating machine, having, in combination, an indenting-tool, a lever upon which the tool is mounted, a second lever acting on the first-mentioned lever to raise the indenting-tool from the work, and means for adjusting the contact-point of said levers toward and from the pivot of the first-mentioned lever, substantially as described.

9. A stitch-separating machine, having, in combination, an indenting-tool, a lever upon one side of which the tool is mounted, a projection on the other side of the lever, a rigid support arranged to be engaged by said projection when the lever is sprung by a resistance offered to the tool, and means for actuating the lever, substantially as described.

10. A stitch-separating machine, having, in combination, an indenting-tool, means to locate said tool in a stitch interval, means to actuate the tool to indent the stitch interval, means to feed the work, and a second indenting-tool yieldingly connected to the first-mentioned tool arranged to locate and indent another stitch interval, substantially as described.

11. A stitch-separating machine, having, in combination, an indenting-tool and actuating means therefor, a slide, a main work-support mounted thereon arranged to engage the bottom of a shoe-sole, an auxiliary support mounted on said slide outside of the main work-support, and means for adjusting the auxiliary support relatively to the main work-support, substantially as described.

12. A stitch-separating machine, having, in combination, two indenting-tools movable relatively to each other, means to locate each of said tools in a separate stitch interval whether the stitches are of uniform or varying length, said means acting to locate each tool before the withdrawal of the other tool and means to actuate said tools to indent said stitch intervals, substantially as described.

In testimony whereof I affix my signature in presence of two witnesses.

JOHN B. HADAWAY.

Witnesses:
   ALFRED H. HILDRETH,
   FRED O. FISH.